United States Patent
Chi et al.

(10) Patent No.: US 9,219,293 B2
(45) Date of Patent: Dec. 22, 2015

(54) CONTROLLING LITHIUM DEPOSITION DURING MANUFACTURE OF A BATTERY

(75) Inventors: Ignacio Chi, Mahtomedi, MN (US);
Michael J. Root, Lino Lakes, MN (US)

(73) Assignee: Cardiac Pacemakers, Inc., St. Paul, MN (US)

(*) Notice: Subject to any disclaimer, the term of this patent is extended or adjusted under 35 U.S.C. 154(b) by 1284 days.

(21) Appl. No.: 12/782,548

(22) Filed: May 18, 2010

(65) Prior Publication Data

US 2010/0327814 A1 Dec. 30, 2010

Related U.S. Application Data

(60) Provisional application No. 61/221,932, filed on Jun. 30, 2009.

(51) Int. Cl.
*H02J 7/00* (2006.01)
*H01M 10/44* (2006.01)
*H01M 10/48* (2006.01)
*H01M 10/52* (2006.01)

(52) U.S. Cl.
CPC .............. *H01M 10/44* (2013.01); *H01M 10/48* (2013.01); *H01M 10/52* (2013.01); *H01M 10/448* (2013.01); *H02J 7/0075* (2013.01)

(58) Field of Classification Search
USPC .............. 320/125, 135, 160; 429/60, 90, 248; 29/2
See application file for complete search history.

(56) References Cited

U.S. PATENT DOCUMENTS

| | | | |
|---|---|---|---|
| 2,451,087 A * | 10/1948 | Hindall | 429/49 |
| 4,484,130 A * | 11/1984 | Lowndes et al. | 320/116 |
| 5,707,756 A | 1/1998 | Inoue et al. | |
| 5,744,261 A | 4/1998 | Muffoletto et al. | |
| 5,834,139 A | 11/1998 | Shodai et al. | |
| 5,882,362 A | 3/1999 | Muffoletto et al. | |
| 6,004,692 A | 12/1999 | Muffoletto et al. | |
| 6,329,789 B1 | 12/2001 | Gavrilov et al. | |
| 6,511,773 B1 | 1/2003 | Dampier | |
| 6,696,201 B2 * | 2/2004 | Leising et al. | 429/231.5 |
| 7,432,001 B1 | 10/2008 | Takeuchi et al. | |
| 2007/0281207 A1* | 12/2007 | Takeuchi et al. | 429/112 |
| 2008/0102353 A1* | 5/2008 | Takezawa et al. | 429/94 |
| 2008/0286655 A1 | 11/2008 | Inoue et al. | |

OTHER PUBLICATIONS

Takeuchi, E., et al., "Lithium Deposition in Prismatic Lithium Cells during Intermittent Discharge", *J. Electrochem. Soc.*,138, (1991), L44.

* cited by examiner

*Primary Examiner* — Samuel Berhanu
(74) *Attorney, Agent, or Firm* — Schwegman Lundberg & Woessner, P.A.

(57) ABSTRACT

The present subject matter provides apparatus and methods for controlling lithium deposition during manufacture of implantable medical device batteries. A method includes processing materials to form the battery and performing a discharge conditioning process step. The discharge conditioning process step includes using a reduced discharge load and applying a discharge load intermittently to decrease formation of lithium deposits on negatively charged surfaces within the battery.

20 Claims, 6 Drawing Sheets

CONTROLLING LITHIUM DEPOSITION DURING MANUFACTURE OF A BATTERY

CROSS REFERENCE TO RELATED APPLICATION

This application claims the benefit of U.S. Provisional Application No. 61/221,932, filed on Jun. 30, 2009, under 35 U.S.C. §119(e), which is hereby incorporated by reference in its entirety.

TECHNICAL FIELD

This application relates generally to implantable medical device batteries and, more particularly, to controlling lithium deposition during manufacture of a battery.

BACKGROUND

Lithium deposits may form in a battery following high rate discharge, such as during a discharge conditioning process step of battery manufacture. The discharge conditioning step includes partially discharging the lithium battery during the manufacturing process to ensure the battery is stable. It is generally desirable to discharge the battery as quickly as possible to maintain high production throughputs. However, the faster the discharge step, the higher the load current that is required, which can lead to increased lithium deposit formation. In some cases, such lithium deposits bridge between negative and positive battery components causing a short circuit. This could lead to early depletion of the battery and other performance or safety issues.

Improved methods of manufacturing batteries for implantable devices are needed.

SUMMARY

The present subject matter provides apparatus and methods for controlling lithium deposition during manufacture of implantable medical device batteries. A method includes conditioning the battery during manufacture, including discharging the battery at approximately the rate the battery takes to discharge in one hour, to decrease formation of lithium deposits on negatively charged surfaces within the battery.

In one embodiment, a method for manufacturing a lithium battery for an implantable device is provided. The method includes conditioning the battery during manufacture, including discharging the battery by applying a discharge load intermittently to decrease formation of lithium deposits.

In one embodiment, a method for controlling timing and duration of discharge during manufacture of a lithium implantable medical device battery is provided. The method comprises conditioning the battery, including discharging the battery at approximately the rate the battery takes to discharge in two hours, discontinuing discharge for a rest period, and continuing to discharge the battery at approximately the rate the battery takes to discharge in two hours This summary is an overview of some of the teachings of the present application and is not intended to be an exclusive or exhaustive treatment of the present subject matter. Further details about the present subject matter are found in the detailed description. The scope of the present invention is defined by the appended claims and their equivalents.

DETAILED DESCRIPTION

The following detailed description of the present subject matter refers to the accompanying drawings which show, by way of illustration, specific aspects and embodiments in which the present subject matter may be practiced. These embodiments are described in sufficient detail to enable those skilled in the art to practice the present subject matter. Other embodiments may be utilized and structural, logical, and electrical changes may be made without departing from the scope of the present subject matter. References to "an", "one", or "various" embodiments in this disclosure are not necessarily to the same embodiment, and such references contemplate more than one embodiment. The following detailed description is, therefore, not to be taken in a limiting sense, and the scope is defined only by the appended claims, along with the full scope of legal equivalents to which such claims are entitled.

The present subject matter provides for controlling lithium deposition during manufacture of implantable medical device batteries, such as batteries with $Li/MnO_2$ cells. Polarization within a battery can occur when high current loads are applied. When the current load is removed, the battery equilibrates chemically and electrochemically which eliminates polarization over time. The rate of equilibration is dependent upon battery chemistry and design, as well as the magnitude of the load and how long the load is applied. Under certain conditions, lithium deposits may form in a battery following high rate discharge, such as a discharge conditioning step during battery manufacturing. It is generally desirable to discharge the battery as quickly as possible to maintain high production throughputs. However, the faster the discharge step, the higher the current that is required leading to conditions that are conducive to lithium deposit formation. In some cases, such lithium deposits may bridge between the negative and positive battery components and cause an internal short circuit, leading to premature depletion of the battery and other performance and safety issues. The present subject matter relates to preventing formation or limiting the size of lithium deposits on the negative surfaces within a lithium battery, such as surfaces that are in direct electrical connection with an anode. Reducing the discharge load and/or applying a high rate load intermittently can control the formation of lithium deposits while maintaining a high manufacturing throughput.

Patients prone to irregular heart rhythms sometimes have miniature heart devices, such as defibrillators and cardioverters, implanted in their bodies. These devices detect onset of abnormal heart rhythms and apply corrective electrical therapy to the heart. The defibrillator or cardioverter includes a set of electrical leads, which extend from a device housing into the heart. Within the device housing are a battery for supplying power, circuitry for detecting abnormal heart rhythms, and a capacitor for delivering bursts of electric current through the leads to the heart. Since defibrillators and cardioverters are typically implanted in the left region of the chest or in the abdomen, a smaller size device, which is still capable of delivering the required level of electrical energy, is desirable.

The basic components that make up a battery are an anode, a cathode, a separator between the anode and the cathode, electrolyte, and packaging hardware such as the case. Batteries can be of a wound, jellyroll, style of design that may be cylindrical or flattened cylindrical in shape. Some designs fold the battery components on top of one another. The anodes and cathodes of the battery are opposed to each other throughout the battery.

A C-rate designation is used to describe the rate at which a batter is charged or discharged. A battery discharged at its C-rate is fully discharged after 1 hour. For example, a battery with a capacity of 1600 mAh and discharged at 1600 mA is being discharged at the C-rate. If the same battery is discharged at 3200 mA it will be fully discharged in half an hour this would be a 2C rate discharge. If the same 1600 mAh battery is discharged at 800 mA it would take 2 hours and a battery person would describe it as discharging at the C/2 rate. The C-rate way of describing a discharge rate communicates how fast a battery is discharged by normalizing its capacity.

Figure 1:
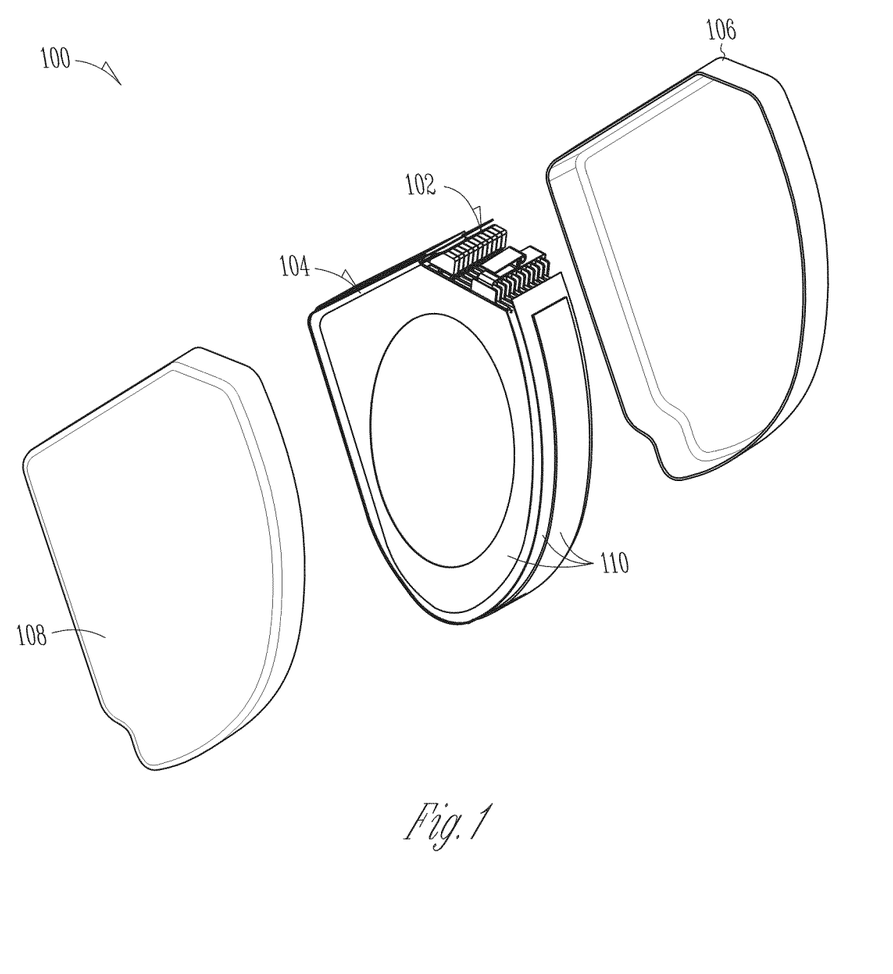
FIG. 1 illustrates an embodiment of a high rate battery for an implantable medical device.

FIG. 1 illustrates an embodiment of a high rate battery for an implantable medical device. High rate batteries such as the one depicted are used in various device applications, such as implantable cardioverter defibrillators (ICDs) or cardiac resynchronization therapy defibrillators (CRTDs). In these high rate applications, currents as high as 3000 mA may be desired for delivering a defibrillating therapy. A high rate battery 100 is typically designed using a stack 102 with multiple cathodes and anodes to increase the surface area of the electrodes, which increases the rate capability. The stack 102 includes multiple portions 110, and are combined to form a completed electrode stack 104, which is housed in a case having a top half 106 and a bottom half 108.

Figure 2:
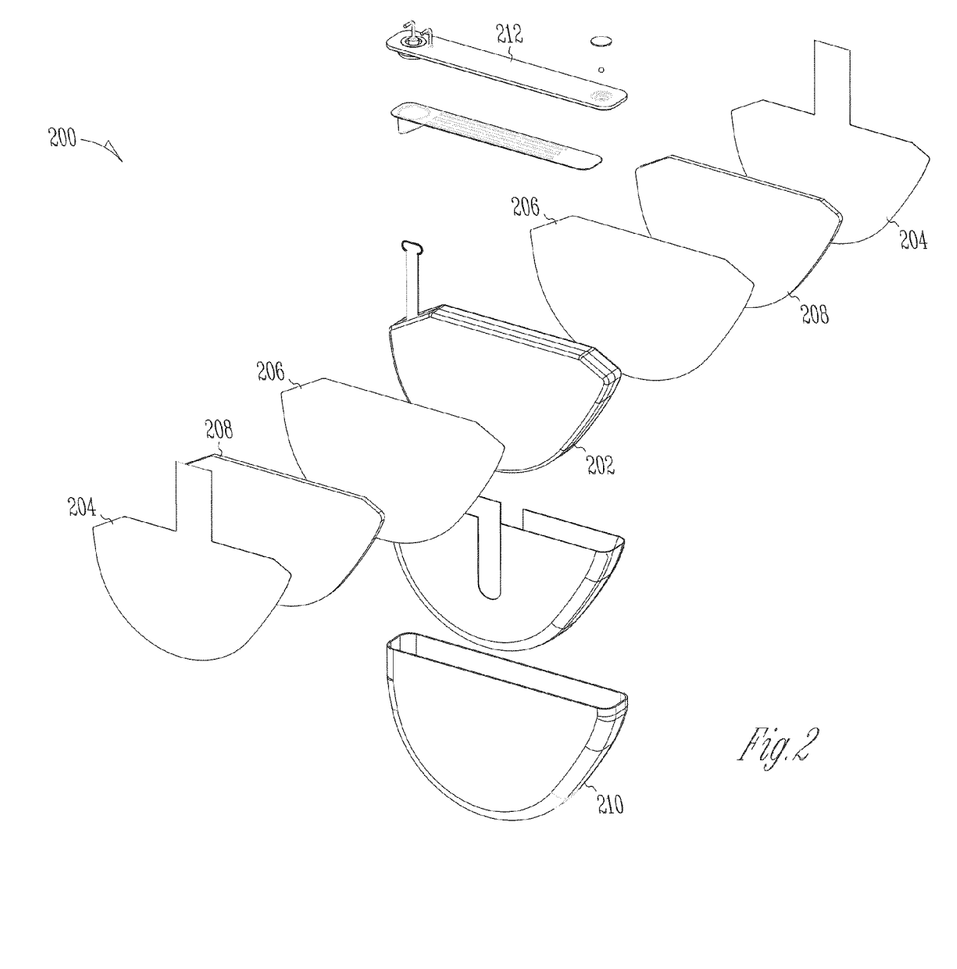
FIG. 2 illustrates an embodiment of a low/medium rate battery for an implantable medical device.

FIG. 2 illustrates an embodiment of a low/medium rate battery for an implantable medical device. Low to medium rate batteries 200 such as the one depicted are used in various device applications, such as pacemakers or other Brady-type devices that do not require high currents as the defibrillators shown above. In these low to medium rate applications, such as a pacemakers, the currents range from 10 uA (for pacing) to 30 mA (for RF telemetry). The design of these batteries is typically one cathode 202 and two anodes 204 since the current requirements are low. It is possible to have a Brady battery design with multiple cathodes and anodes, but the surface area will generally be lower than that of a high rate battery design. The depicted battery 200 includes separators 206 between lithium 208 and cathode 202. The stacked battery is housed in can 210 having lid 212.

Lithium deposits may form in a battery following high rate discharge, such as during a discharge conditioning process step of battery manufacture. The discharge conditioning step includes partially discharging the lithium battery during the manufacturing process to ensure the battery is stable. It is generally desirable to discharge the battery as quickly as possible to maintain high production throughputs. However, the faster the discharge step, the higher the load current that is required, which can lead to increased lithium deposit formation. In some cases, such lithium deposits bridge between negative and positive battery components causing a short circuit. This could lead to early depletion of the battery and other performance or safety issues.

Figure 3A:
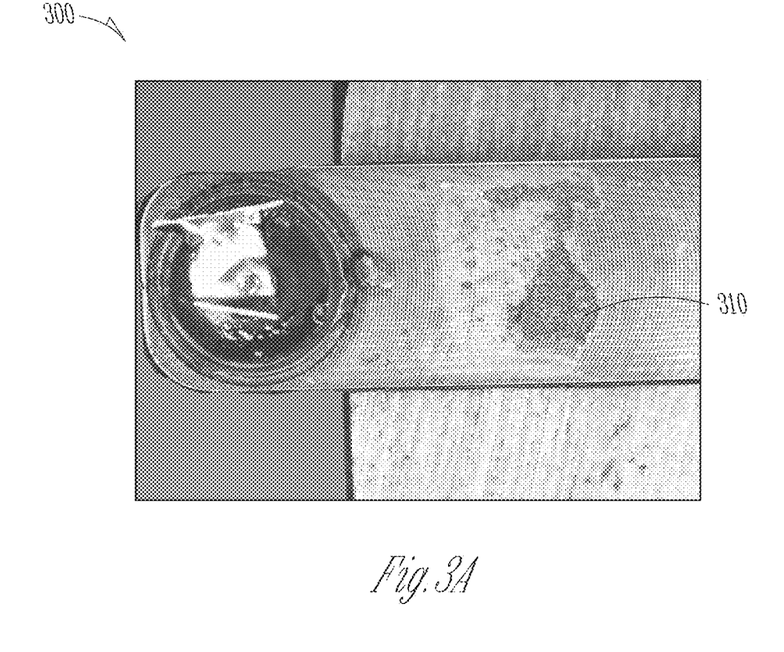
FIG. 3A illustrates an implantable medical device battery after discharge during manufacture of the battery.
Figure 3B:
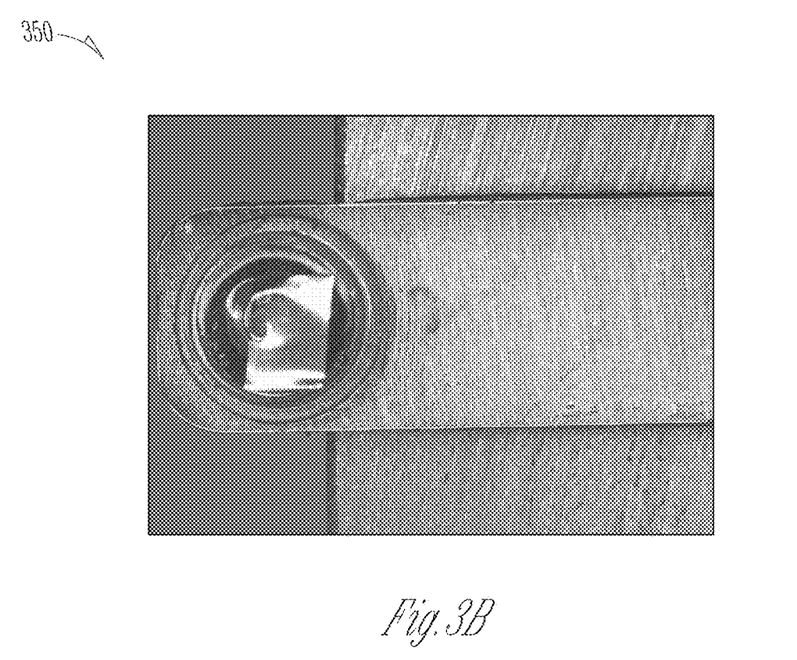
FIG. 3B illustrates an implantable medical device battery after discharge during manufacturing of the battery, according to an embodiment of the present subject matter.
Figure 4A:
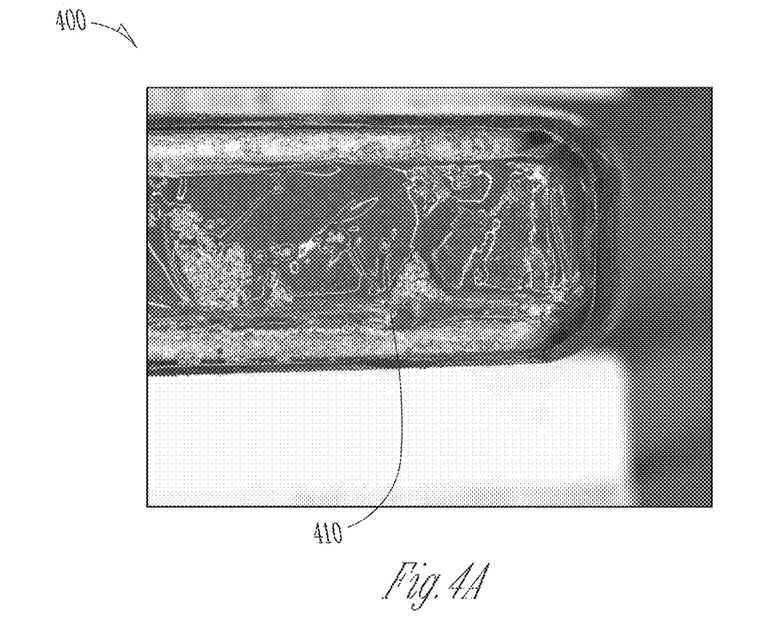
FIG. 4A illustrates an implantable medical device battery after discharge during manufacture of the battery.
Figure 4B:
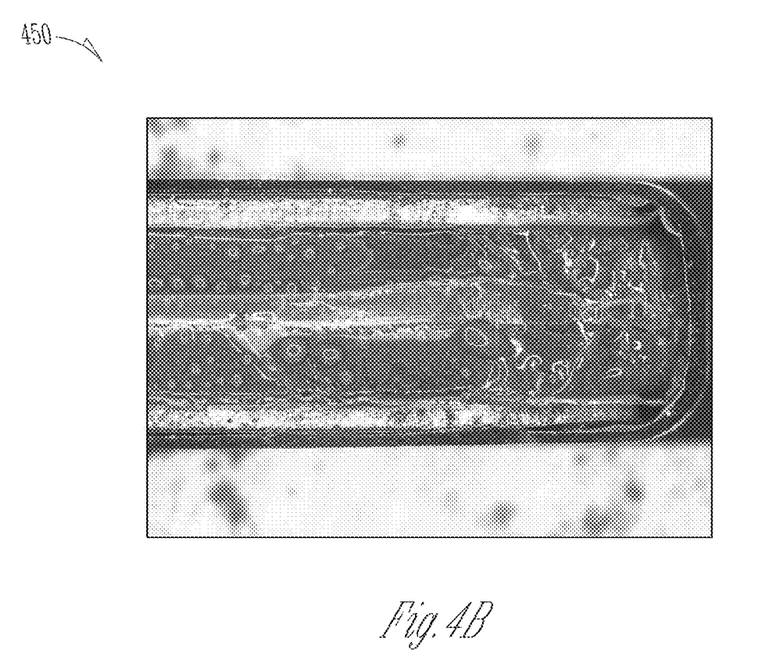
FIG. 4B illustrates an implantable medical device battery after discharge during manufacturing of the battery, according to an embodiment of the present subject matter.

FIG. 3A illustrates an implantable medical device battery after discharge during manufacture of the battery. The depicted battery 300 has been discharged at a relatively high rate, and lithium deposits 310 have formed. FIG. 3B illustrates an implantable medical device battery after discharge during manufacturing of the battery, according to an embodiment of the present subject matter. By controlling the rate and load for predischarging the battery 350, little or no sign of lithium deposition is visible. Similarly, FIG. 4A illustrates an implantable medical device battery after discharge during manufacture of the battery. The depicted battery 400 has been discharged at a relatively high rate, and lithium deposits 410 have formed. FIG. 4B illustrates an implantable medical device battery after discharge during manufacturing of the battery, according to an embodiment of the present subject matter. By controlling the rate and load for predischarging the battery 450, lithium deposition is visibly reduced. The present subject matter provides for controlling lithium deposition during manufacture of implantable medical device batteries.

The present subject matter provides for using a reduced discharge load and/or intermittent discharge rate to reduce lithium deposition that adversely affects battery performance and longevity. Discharge waveforms can use a plurality of square waves, triangular waves, sinusoidal waves or a combination of any of these or other waveforms. Intermittent discharge, such as periodic discharge, can use discharge periods separated by rest periods equal or less than the time required for the battery to equilibrate (or exhibit a lack of polarization). The rest periods can be augmented by exposing the battery to an elevated temperature during the rest period, to reduce the time needed to equilibrate. The discharge load is programmable, in various embodiments, and can include variable current, resistance or power.

In various embodiments, the time period for discharging the battery is doubled, and a C/2 rate is used for discharge. In another embodiment, the battery is discharged at the C-rate for 90 seconds, followed by a rest period of 60 seconds, followed by discharge at the C-rate for 90 seconds. In another embodiment, the battery is discharged at the C/2 rate for 180 seconds, followed by a rest period of 60 seconds, followed by discharge at the C/2 rate for 180 seconds. The battery is discharged at a C/4 rate for 180 seconds, followed by a rest period of 60 seconds, followed by discharge at the C/4 rate for 180 seconds, followed by soaking the battery in a heated fluid for a time period, followed by discharge at the C/2 rate for 180 seconds, in another embodiment.

Figure 5:
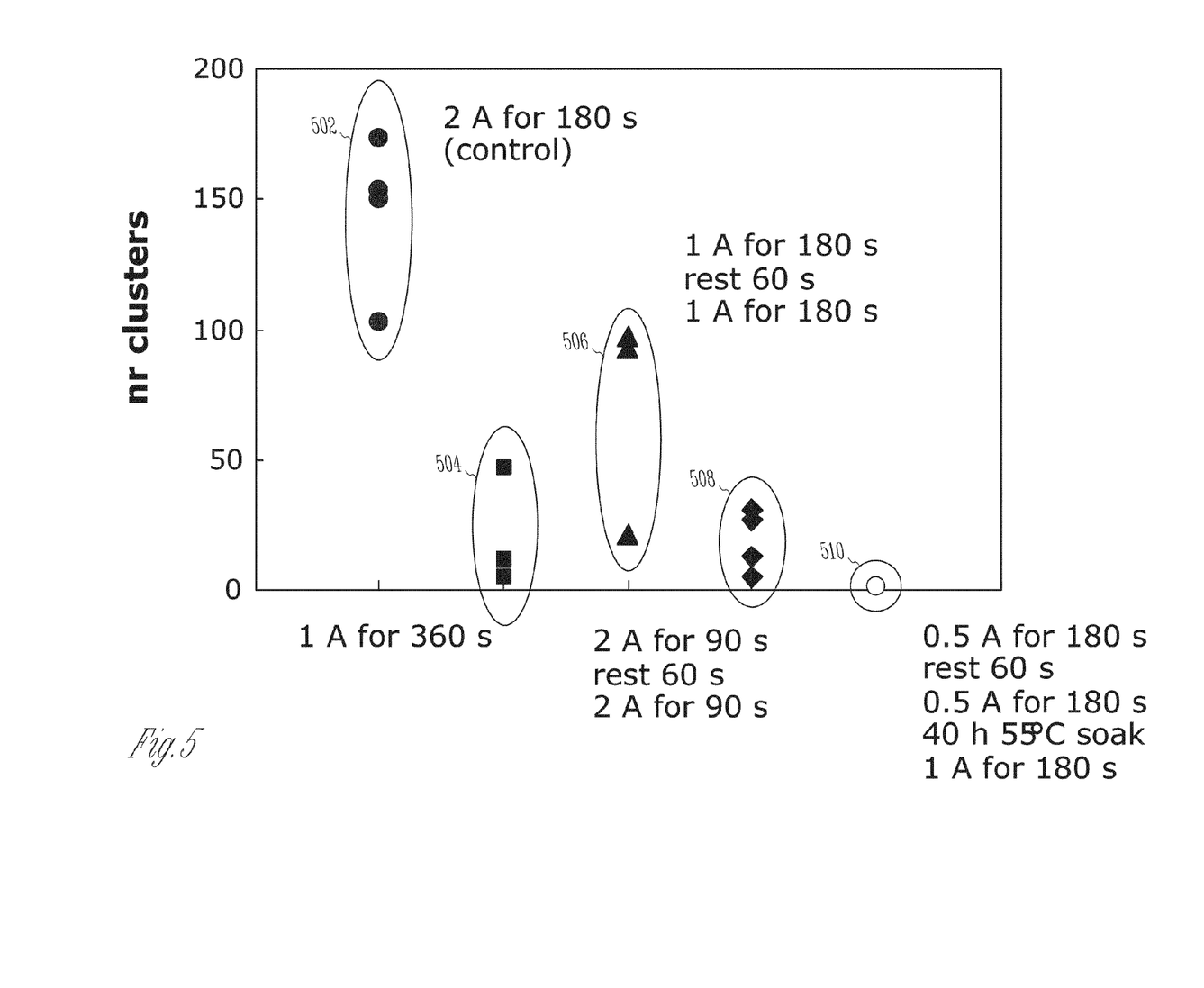
FIG. 5 is a graphical illustration of the effect of controlled pre-discharge of an implantable device battery on lithium deposition, according to various embodiments of the present subject matter.

FIG. 5 is a graphical illustration of the effect of controlled pre-discharge of an implantable device battery on lithium deposition, according to various embodiments of the present subject matter. A battery is first discharged at 2 amperes (A) for 180 seconds. This produced a high level of lithium deposition, as shown at 502. The methods of the present subject matter were then implemented, such as using a controlled rate of discharge and/or using intermittent rest or "off" periods during the discharge process. The results show a reduction in lithium deposition. For example, when the same battery was discharged at 1 A for 360 seconds, a reduction in lithium deposition is shown at 504. In one embodiment, the battery was discharged intermittently, using a current of 1 A for 180 seconds, then resting for 60 seconds, then discharging at 1 A for 180 seconds, at 506. In another embodiment, the battery was discharged intermittently using a current of 2 A for 90 seconds, then resting for 60 seconds, then discharging at 2 A for 90 seconds, at 508. Various embodiments of the present subject matter apply heat to the battery during one or more rest periods to further prevent lithium formation. An example is shown at 510, where the battery was charged intermittently using a current of 0.5 A for 180 seconds, then resting for 60 seconds, then discharging at 0.5 A for 180 seconds, followed by soaking the battery in heated fluid (55 degrees C. in the depicted embodiment) for 40 hours, then discharging the battery using a current of 1 A for 180 seconds.

In one embodiment, a high rate battery is predischarged using a current of approximately C-rate for 180 seconds. In one embodiment using a low to medium rate battery, the cell is pre discharged at C/180 rate for 8 hours. This predischarge is done to stabilize the $Li/MnO_2$ chemistry (prevent decomposition of the electrolyte) and the battery is discharged 4-6% of its initial capacity. In terms of C-rates for predischarging low to medium rate batteries, various embodiments use a rate in the range from C/50 to C/250. The prescribed range for low to medium rate batteries is C/100 to C/200, in various embodiments. The time range depends on the chemistry and design capacity of the cell, but a range would be 1 to 20 hours in various embodiments. The prescribed time range for low to medium rate batteries is 5 to 12 hours, in various embodiments. These times are for discharge at constant current. If rest periods are used, the times are adjusted. Current "on" times and rest times can range from 1 second to 60 minutes, in various embodiments. In one embodiment, rest times for intermittent discharging range from 10 seconds to 30 minutes. In one example, a cell that is pre discharged at C/80 rate would be completed in 3 hours and 35 minutes but if the cell is predischarged at the same rate for 10 seconds on and 10 seconds off, it would take 8 hours to complete the pre discharge.

Figure 6:
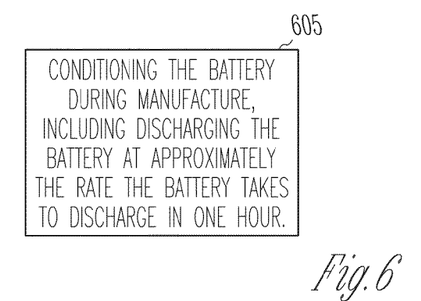
FIG. 6 is a flow chart illustrating an embodiment of a method for controlling lithium deposition during manufacture of implantable medical device batteries.

FIG. 6 is a flow chart illustrating an embodiment of a method for controlling lithium deposition during manufacture of implantable medical device batteries. The method includes conditioning the battery during manufacture at 605, including discharging the battery at approximately the rate the battery takes to discharge in one hour, to decrease formation of lithium deposits on negatively charged surfaces within the battery. The discharge conditioning process step includes using a reduced discharge load to decrease formation of lithium deposits on negatively charged surfaces within the battery. According to various embodiments, conditioning the battery includes using a programmable level of current for discharging. Conditioning the battery includes discharging at a programmable rate, in an embodiment. The programmable rate is less than a rate that negative and permanently affects battery performance, according to various embodiments. In various embodiments, conditioning the battery includes discharging the battery at approximately the rate the battery takes to discharge in two hours. The method further includes discharging the battery by applying a discharge load intermittently, in an embodiment. In one embodiment, using a reduced discharge load includes reducing the load below 20 mA. In another embodiment, using a reduced discharge load includes using a discharge load of 8.5 mA. Discharging the battery over an increased time period includes increasing the time period for discharging the battery from 1 hour to 4 hours, in an embodiment. The time period is increased from 1 hour to 8 hours, in another embodiment.

Figure 7:
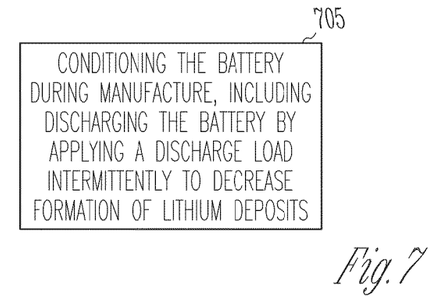
FIG. 7 is a flow chart illustrating an embodiment of a method for manufacturing a lithium battery for an implantable device.

FIG. 7 is a flow chart illustrating an embodiment of a method for manufacturing a lithium battery for an implantable device. The method includes conditioning the battery during manufacture at 705, including discharging the battery by applying a discharge load intermittently to decrease formation of lithium deposits. The discharge conditioning process step includes applying a discharge load intermittently to decrease formation of lithium deposits on negatively charged surfaces within the battery. According to various embodiments, applying a discharge load intermittently includes applying a discharge load periodically. A discharge wave form is applied that includes a plurality of discharge square waves, triangular waves, and/or sinusoidal waves, according to various embodiments. Applying a discharge load intermittently includes separating discharge periods by rest periods equal to or less than time required for the battery to equilibrate, in an embodiment. Various rest periods can be used, such as a sixty seconds in an embodiment. Applying a discharge load periodically includes applying a discharge load for 90 seconds between rest periods in an embodiment. In another embodiment, a discharge load is applied for 180 seconds between rest periods. Various load application times and rest periods can be used for different batteries without departing from the scope of this disclosure. According to various embodiments, applying a discharge load periodically includes applying an elevated temperature to the battery during the rest period. In an embodiment, a discharge load approximately equal to half of battery C-rate is used, or the rate the battery takes to discharge in two hours.

Figure 8:
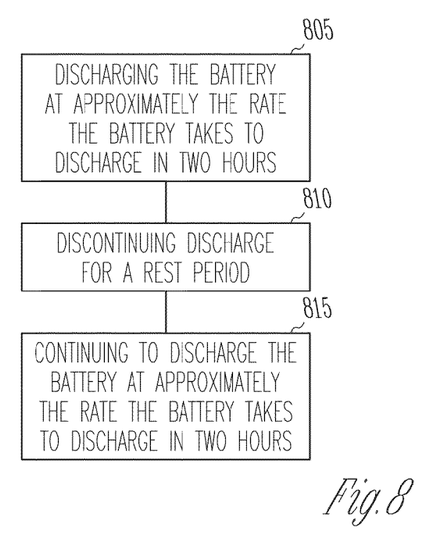
FIG. 8 is a flow chart illustrating an embodiment of a method for controlling timing and duration of discharge during manufacture of a lithium implantable medical device battery.

FIG. 8 is a flow chart illustrating an embodiment of a method for controlling timing and duration of discharge during manufacture of a lithium implantable medical device battery. The method comprises conditioning the battery, including discharging the battery at approximately the rate the battery takes to discharge in two hours, at 805, discontinuing discharge for a rest period, at 810, and continuing to discharge the battery at approximately the rate the battery takes to discharge in two hours, at 815. According to various embodiments, conditioning the battery includes using a programmable level of current, power and/or resistance for discharging. In various embodiments, applying a discharge load intermittently includes applying a discharge load periodically, such as using a sixty second rest period between applying a discharge load for 90 second intervals between rest periods. The amount of discharge load can vary based on type of battery to be discharged. In one example using a low to medium rate battery, using a reduced discharge load includes reducing the load below 20 mA. In another example, using a reduced discharge load includes using a discharge load of 8.5 mA. In various embodiments, heat is applied to the battery during the rest period, such as by soaking the battery in a heated fluid. In one embodiment, applying heat to the battery includes soaking the battery in the heated fluid for approximately 40 hours.

Using a reduced discharge load includes discharging the battery over an increased time period, in an embodiment. In various embodiments, applying a discharge load intermittently includes applying a discharge load periodically, such as using a sixty second rest period between applying a discharge load for 90 second intervals between rest periods. The amount of discharge load can vary based on type of battery to be discharged. In one example using a low to medium rate battery, using a reduced discharge load includes reducing the load below 20 mA. In another example, using a reduced discharge load includes using a discharge load of 8.5 mA.

One of ordinary skill in the art will understand that, the modules and other circuitry shown and described herein can be implemented using software, hardware, and combinations of software and hardware. As such, the terms module and circuitry, for example, are intended to encompass software implementations, hardware implementations, and software and hardware implementations.

The methods illustrated in this disclosure are not intended to be exclusive of other methods within the scope of the present subject matter. Those of ordinary skill in the art will understand, upon reading and comprehending this disclosure, other methods within the scope of the present subject matter. The above-identified embodiments, and portions of the illustrated embodiments, are not necessarily mutually exclusive. These embodiments, or portions thereof, can be combined. In various embodiments, the methods are implemented using a computer data signal embodied in a carrier wave or propagated signal, that represents a sequence of instructions which, when executed by one or more processors cause the processor(s) to perform the respective method. In various embodiments, the methods are implemented as a set of instructions contained on a computer-accessible medium capable of directing a processor to perform the respective method. In various embodiments, the medium is a magnetic medium, an electronic medium, or an optical medium.

The above detailed description is intended to be illustrative, and not restrictive. Other embodiments will be apparent to those of skill in the art upon reading and understanding the above description. The scope of the invention should, therefore, be determined with reference to the appended claims, along with the full scope of equivalents to which such claims are entitled.

What is claimed is:

1. A method of manufacturing a lithium battery for an implantable device, the method comprising:
    decreasing the formation of lithium deposits, wherein decreasing the formation of lithium deposits includes conditioning the battery during manufacture using a controlled rate of discharge and load current, wherein conditioning the battery includes controlling the rate of discharge of the battery to be the rate of discharge the battery takes to discharge in one hour.

2. The method of claim 1, wherein conditioning the battery includes using a programmable level of current for discharging.

3. The method of claim 1, wherein conditioning the battery includes discharging at a rate that is programmable by a user.

4. The method of claim 1, further comprising discharging the battery by applying a discharge load intermittently.

5. A method of manufacturing a lithium battery for a brady-type implantable device the method comprising:
    decreasing the formation of lithium deposits, wherein decreasing the formation of lithium deposits includes conditioning the battery during manufacture using a controlled rate of discharge and load current, wherein conditioning the battery includes controlling the rate of discharge of the battery to be a rate of C/100 to C/200.

6. The method of claim 5, wherein conditioning the battery includes discharging the battery over a time period of between 5 to 12 hours.

7. A method of manufacturing a lithium battery for an implantable device, the method comprising:
    decreasing the formation of lithium deposits, wherein decreasing the formation of lithium deposits includes conditioning the battery during manufacture using a controlled rate of discharge and load current, wherein conditioning the battery includes controlling the rate of discharge of the battery by applying a discharge load intermittently.

8. The method of claim 7, wherein applying a discharge load intermittently includes applying a discharge load periodically.

9. The method of claim 8, wherein applying a discharge load periodically includes applying a discharge wave form that includes a plurality of discharge square waves, triangular waves, and/or sinusoidal waves.

10. The method of claim 8, wherein applying a discharge load intermittently includes separating discharge periods by rest periods equal to or less than time required for the battery to equilibrate.

11. The method of claim 10, wherein applying a discharge load periodically includes providing a sixty second rest period between applying a discharge load.

12. The method of claim 10, wherein applying a discharge load periodically includes applying an elevated temperature to the battery during the rest period.

13. The method of claim 8, wherein applying a discharge load periodically includes applying a discharge load at the rate the battery takes to discharge in two hours.

14. A method of manufacturing a lithium battery for an implantable device, the method comprising:
    decreasing the formation of lithium deposits on negatively charged surface within the battery, wherein decreasing the formation of lithium deposits includes conditioning the battery during manufacture using a controlled rate of discharge and load current, wherein conditioning the battery includes:
    controlling the rate of discharge of the battery to be the rate the battery takes to discharge in two hours;
    discontinuing discharge for a rest period; and
    continuing to discharge the battery at the rate the battery takes to discharge in two hours.

15. The method of claim 14, wherein discharging the battery includes discharging the battery for 90 seconds.

16. The method of claim 14, wherein discontinuing discharge includes discontinuing discharge for a 60 second rest period.

17. The method of claim 14, wherein continuing to discharge the battery includes continuing to discharge the battery for 90 seconds.

18. The method of claim 14, further comprising applying heat to the battery during the rest period.

19. The method of claim 18, wherein applying heat to the battery includes soaking the battery in a heated fluid.

20. The method of claim 19, wherein applying heat to the battery includes soaking the battery in the heated fluid for 40 hours.

* * * * *